(12) United States Patent
Shah

(10) Patent No.: US 7,925,542 B2
(45) Date of Patent: *Apr. 12, 2011

(54) WISH LIST ASSOCIATED WITH BUDDY LIST SCREEN NAME

(75) Inventor: Ketan Shah, San Jose, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/258,237

(22) Filed: Oct. 24, 2008

(65) Prior Publication Data

US 2009/0112729 A1    Apr. 30, 2009

Related U.S. Application Data

(63) Continuation of application No. 10/171,435, filed on Jun. 13, 2002, now Pat. No. 7,444,297.

(51) Int. Cl.
*G06Q 30/00* (2006.01)

(52) U.S. Cl. ............... 705/26.1; 705/1; 705/27.1

(58) Field of Classification Search ........ 705/26, 705/27
See application file for complete search history.

(56) References Cited

U.S. PATENT DOCUMENTS

| 5,663,547 A | 9/1997 | Ziarno |
| 5,665,952 A | 9/1997 | Ziarno |
| 5,696,366 A * | 12/1997 | Ziarno .................. 235/380 |
| 5,754,981 A | 5/1998 | Veeneman et al. |
| 5,774,874 A * | 6/1998 | Veeneman et al. ........... 705/27 |
| 5,898,594 A | 4/1999 | Leason et al. |
| 5,970,474 A | 10/1999 | LeRoy et al. |
| 6,038,554 A | 3/2000 | Vig |
| 6,055,513 A | 4/2000 | Katz et al. |
| 6,061,057 A | 5/2000 | Knowlton et al. |
| 6,078,928 A | 6/2000 | Schnase et al. |
| 6,141,006 A | 10/2000 | Knowlton et al. |

(Continued)

FOREIGN PATENT DOCUMENTS

EP    1168169    1/2002

(Continued)

OTHER PUBLICATIONS

10 Tricks We Wish Buddy LIsts Could Do; Molly Wood; Jul. 2, 2001; c/net Software; http:home.cnet.com/software/0-5566362-8-6382611-1.html.*

(Continued)

*Primary Examiner* — Jason Dunham
(74) *Attorney, Agent, or Firm* — Michael A. Glenn; Glenn Patent Group

(57) ABSTRACT

The present invention relates to a method and apparatus for connecting wish lists to users, thus making wish lists accessible to such user attributes as buddy lists, or the equivalent. The invention attaches a wish list to an instant messaging name and therefore makes it available to all persons on the user's buddy list. In a further embodiment of the invention, the wish list is attached to an account, such as a wallet. As a result, various conveniences are provided. For example, a member of the user's buddy list can give a gift to the user from the wish list; a group can contribute incrementally to the giving of a gift to the user; an individual can add incremental amounts to his or her wish list to pay for an item on time (as a type of layaway); and relatives and friends can give gifts that they know will be appreciated because the gifts are on the user's wish list.

11 Claims, 3 Drawing Sheets

U.S. PATENT DOCUMENTS

| | | | |
|---|---|---|---|
| 6,321,211 B1 | 11/2001 | Dodd | |
| 6,343,274 B1 | 1/2002 | McCollom et al. | |
| 6,609,106 B1 * | 8/2003 | Robertson | 705/26 |
| 6,611,814 B1 * | 8/2003 | Lee et al. | 705/26 |
| 6,633,849 B1 * | 10/2003 | Dodd | 705/26 |
| 7,013,292 B1 * | 3/2006 | Hsu et al. | 705/37 |
| 7,080,139 B1 * | 7/2006 | Briggs et al. | 709/224 |
| 7,120,672 B1 * | 10/2006 | Szeto et al. | 709/206 |
| 7,133,900 B1 * | 11/2006 | Szeto | 709/206 |
| 2001/0049636 A1 * | 12/2001 | Hudda et al. | 705/26 |
| 2002/0023132 A1 * | 2/2002 | Tornabene et al. | 709/205 |
| 2002/0042775 A1 * | 4/2002 | Nelson et al. | 705/39 |
| 2002/0077929 A1 * | 6/2002 | Knorr et al. | 705/26 |
| 2002/0107783 A1 * | 8/2002 | La Mura et al. | 705/37 |
| 2002/0128934 A1 * | 9/2002 | Shaer | 705/27 |
| 2002/0178087 A1 * | 11/2002 | Henderson et al. | 705/26 |
| 2003/0018726 A1 * | 1/2003 | Low et al. | 709/206 |
| 2003/0074265 A1 * | 4/2003 | Oshima | 705/26 |
| 2003/0163399 A1 * | 8/2003 | Harper et al. | 705/35 |
| 2004/0148228 A1 * | 7/2004 | Kwei | 705/26 |
| 2006/0206563 A1 * | 9/2006 | Van De Sluis | 709/203 |

FOREIGN PATENT DOCUMENTS

| | | |
|---|---|---|
| EP | 1176531 | 1/2002 |
| WO | WO 94/27226 | 11/1994 |
| WO | WO 00/04711 | 1/2000 |
| WO | WO 00/39738 | 7/2000 |
| WO | WO 00/42550 | 7/2000 |
| WO | WO 01/16786 | 3/2001 |
| WO | WO 01/35186 | 5/2001 |

OTHER PUBLICATIONS

*Top Ten IM Wishes*—retrieved on Jun. 11, 2002 from clnet Software web site; http://home.cnet.com/software/0-5566362-8-6382611-2.html?tag=st.sw.5566362-8-6382611-1.txt.5566362-8-6382611-2.

Wood, Molly; *10 Tricks We Wish Buddy List Could Do*; Jul. 2, 2001; retrieved on Jun. 11, 2002 from clnet Software; http://home.cnet.com/software/0-5566362-8-6382611-1.html.

Kohda, Y. et al.;*IMPP a New Instant Messaging Standard and Its Impact on Internet Business*; Dec. 2000;Y. Kohda, H. Sugano, S. Okuyama; Fujitsu Scientific and Technical Journal.

Rapaport, L.; *Instant Messaging for Corporate Collaboration*; Nov. 2001; Transform Magazine.

Maloney, D.; *Crate & Barrel*; Apr. 2001; Modern Materials Handling.

Swint, et al.; *The US Transuranium Registry: The Final Contribution or Ultimate Gift*; Jun. 3-7, 1984; Transactions of the American Nuclear Society.

*Conversion from Paper to COM Improves Data Handling*; 1982; IMC Journal.

* cited by examiner

WISH LIST ASSOCIATED WITH BUDDY LIST SCREEN NAME

CROSS REFERENCE TO RELATED APPLICATION

This application is a Continuation of and claims priority to U.S. application Ser. No. 10/171,435, filed 13 Jun. 2002 now U.S. Pat. No. 7,444,297, which is incorporated herein in its entirety by this reference thereto.

BACKGROUND OF THE INVENTION

1. Technical Field

The invention relates to wish lists which are associated with an account per user. More specifically, the invention relates to connecting a wish list to a user's instant messenger name, thus making the wish list available to all persons on the user's buddy list. Furthermore, when a wish list is created, an account is also created to allow users to deposit or contribute funds into that account.

2. Description of the Prior Art

With the abundance of personal computers in the hands of users in many situations, such as at home, at work, at school, etc., the Internet is accessible to most consumers and electronic commerce (e-commerce) is widespread. Presently, many such consumers have had experience with or are at least familiar with the concept and use of wish lists. A typical wish list use is described with reference to FIG. 1, a schematic diagram of a user using a wish list on a particular web site and getting notification via e-mail. A user 10 visits a particular web site, such as a manufacturer's web site 20, and discovers that he or she desires to purchase an item. For a variety of reasons, the user may desire to postpone the actual purchase of the item. For example, it may be that the user does not have sufficient funds. Then, the user may create a wish list 30 from and associated with the manufacturer's site 20 and add the desired item to that wish list. As a result, the user has a wish list associated only with this particular manufacturer that is assigned to him or her 20, and such that the wish list is accessible only with information identifying the user. That is, the wish list is intended to be accessible only to the user.

Furthermore, if a user wanted his friends, relatives, or buddies to view his wish list, he would have to give each person his personal identifying information, such as his password. The accessibility of wish lists for multiple items is much more complex. In this case, the user desires multiple items, some of which are only available on different manufacturers' web sites, each web site supporting its own wish list for the user. Thus, the user has to tell a plurality of friends or relatives a plurality of passwords and other information for a plurality of wish lists on different web sites.

There is a need, therefore, for a user to allow friends, relatives, and online buddies to access a central location online, such as a single wish list, to obtain the user's information regarding potential purchases, such as specific items the user desires, the prices, how much paydown has already been applied, etc.

In 10 Tricks We Wish Buddy List Could Do; Molly Wood; Jul. 2, 2001; c|net Software; links to Top Ten IM Wishes— c|net Software web site; solutions to buddy list problems as well as desired other conveniences are proposed. However, nowhere does M. Wood suggest or teach buddy list integration with e-commerce. More specifically, nowhere on these web pages does M. Wood suggest having a user's wish list be accessible to other user attributes, such as a buddy list, attaching a user's wish list to an instant messaging name, or attaching a user's wish list to an account, such as a wallet.

Y. Kohda, H. Sugano, and S. Okuyama discuss applying the power of instant messaging, especially that of the "buddy list," to electronic commerce. More specifically, Kohda, et al are engaged in standardization for instant messaging at the Internet Engineering Task Force (IETF) to make an open and secure standard called IMPP. Kohda, et al submit their version of Instant Messaging and Presence Protocol (IMPP) for the purpose of selective publication of presence for electronic commerce. Kohda, et al describe an application to electronic commerce, wherein customers show their selective presence to sales companies, and the sales companies send short sales-promotion messages to selected target customers. That is, Kohda, et al teach that selective publication of presence makes it possible to selectively publish contents on an electronic shopping cart to sales companies. Only designated sales companies are given the chance to initiate sales promotions. Nowhere do Kohda, et al teach or suggest having a user's wish list be accessible to other user attributes, such as a buddy list, attaching a user's wish list to an instant messaging name, or attaching a user's wish list to an account, such as a wallet.

M. LeRoy, P. Wasson, J. Brabson, and R. Trainer disclose a product information system for selecting, monitoring and purchasing of products in a retail establishment that includes a product selection device, a point-of-sale data input device, and a host computer. Bascially, LeRoy, et al teach a distributed gift registry for gift registrants at one site, such as in New York, a gift registrant database in Chicago, and the point of sale being in San Francisco (see FIG. 2). LeRoy, et al teach a national database and an inter-site product for a single retail establishment. However, LeRoy, et al, do not teach or suggest that a user's wish list of items not limited to a single retail establishment be accessible to other attributes of the user, such as the user's buddy list. Furthermore, LeRoy, et al do not teach or suggest attaching a user's wish list to an instant messaging name, thereby also making the wish list available to all persons on a buddy list associated with the instant messaging name, or attaching a user's wish list to an account, such as a wallet.

W. J. Veeneman, P. R. Brooks, and S. B. Poulter, Gift Registry Apparatus and Method, U.S. Pat. No. 5,754,981 (May 19, 1998) disclose a gift registry apparatus that provides registration of information for a gift registrant and allows access to the registry by potential gift giver users. The apparatus is a network of computer terminals used in conjunction with a bar code scanner. A registrant provides personal information. The bar code scanner is used to obtain product information on desired gifts. The personal information and the product information are associated together. The apparatus is accessed by potential gift givers to obtain printouts of potential gifts for particular registrants. Veeneman, et al teach an apparatus and method that clearly are limited by a single store, the registrant walking the store with a bar code scanner (see FIGS. 5, 6 and 12), the potential gift giver using a printout (FIGS. 7 and 8) to learn what has been purchased, and a stationary kiosk (FIG. 11), for example. Nowhere do Veeneman, et al teach or suggest having a user's wish list be accessible to other user attributes, such as a buddy list, attaching a user's wish list to an instant messaging name, or attaching a user's wish list to an account, such as a wallet.

J. Mendelssohn, G. Saenger, and D. McNair, On-Line Gift Registry System and Method, WO 00/39738 (Jul. 6, 2000) disclose a gift registry system and method that allows an end user to use a terminal having an input device and a display to register for gifts or to purchase an item from a registry or registrant. Such system receives identification information from an input device of a user terminal. Then, a list of gift item records that are correlated with the received identification information in the registry database is generated. If any such records are found, the generated list is displayed on a display of the user terminal. If the user is a registrant, the registrant may modify the generated list, and the registry is updated. If the user is a new registrant, the registrant may create a new list, and save the created list in the registry. If the user is a gift purchaser, a determination is made as to whether a purchase has occurred with respect to a gift item record selected from the generated list. Finally, upon determining that the purchase has occurred, the registry database system is updated to reflect the purchase. Nowhere do Mendelssohn, et al teach or suggest having a user's wish list be accessible to other user attributes, such as a buddy list, attaching a user's wish list to an instant messaging name, or attaching a user's wish list to an account, such as a wallet.

It would be advantageous to have a user's wish list be accessible to other user attributes, such as a buddy list.

It would also be advantageous to attach a user's wish list to an instant messaging name, thereby also making the wish list available to all persons on a buddy list associated with the instant messaging name.

It would also be advantageous to attach a user's wish list to an account, such as a wallet. Attaching the wish list to an account or wallet allows multiple users to contribute finds towards the purchase of one or more items in the wish list. It also allows the user to automatically purchase that item in store once the required amount of funds is deposited in or credited to the account associated with the wish list.

SUMMARY OF THE INVENTION

The present invention relates to a method and apparatus for connecting wish lists to users, thus making wish lists accessible to such user attributes as buddy lists, or the equivalent. The invention attaches a wish list to an instant messaging name and therefore makes it available to all persons on the user's buddy list. In a further embodiment of the invention, the wish list is attached to an account, such as a wallet. As a result, various conveniences are provided. For example, a member of the user's buddy list can give a gift to the user from the wish list; a group can contribute incrementally to the giving of a gift to the user; an individual can add incremental amounts to his or her wish list to pay for an item on time (as a type of layaway); and relatives and friends can give gifts that they know will be appreciated because the gifts are on the user's wish list.

DETAILED DESCRIPTION OF THE INVENTION

Figures 1, 4:
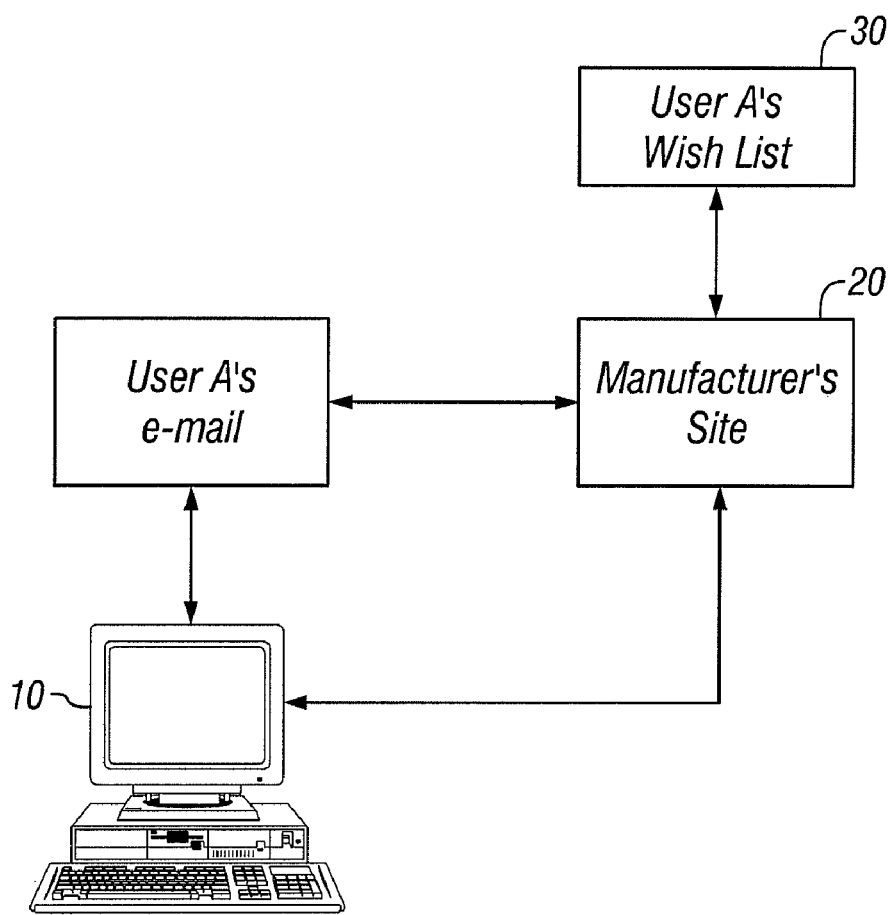
FIG. 1 is a schematic diagram of a user using a wish list on a particular web site and getting notification via e-mail according to the prior art.
FIG. 4 is an example of a properties display for a member of an instant messaging application according to the invention.

The present invention relates to a method and apparatus for connecting wish lists to users, thus making wish lists accessible to attributes of the user, such as, for example, buddy lists. The idea is that each user populates with desired items a wish list which is also visible and/or accessible to the user's buddies. The user identifies in the wish list those items, such as products or services, that the user would like to receive as a gift or simply possess. Because the user's buddies have access to the user's wish list, the user's buddies have the ability to purchase items that the user desires, i.e. those which are on the wish list, and give such items to the user.

In one embodiment of the invention, the invention attaches a wish list to an instant messaging name, thereby making it available to all persons on the user's buddy list. In a further embodiment of the invention, the wish list is also attached to an account, such as a wallet, which is created when the wish list is created. As a result of attaching a wish list to an account, various conveniences are provided. For example, a member of the user's buddy list can give a gift to the user from the wish list; a group can contribute incrementally to the giving of a gift to the user; an individual can add incremental amounts to his or her wish list to pay for an item in time (as a type of layaway); and relatives and friends can give gifts that they know will be appreciated because the gifts are on the user's wish list.

According to a preferred embodiment of the invention, a first member of a network or an Internet provider community with chat capability, such as, for example, America Online, Inc. (AOL) and AOL Instant Messenger$^{SM}$ (AIM), creates a wish list. The wish list is then visible or accessible only to other AOL members who are in the first member's buddy list.

The preferred embodiment of the invention includes having the user optionally enter important dates, such as a birthday and a marriage anniversary date. The user can enter important dates when creating the wish list, for example. Thus, the other members accessing the first member's wish list are made aware of and can obtain the first member's important dates.

Any member who wants to purchase or send a gift to a second member simply looks at the second member's wish list and then proceeds to purchase and send the gift. Purchasing the gift becomes easier when an account or wallet mechanism is added and used. Such features alone or combined create a convenience and an extended service offered by vendor sites, ISP provider and partner sites, Shop@AOL, and the like.

An example of implementing the preferred embodiment of the invention includes a user making a purchase using a search functionality, such as Shop@AOL's Shop Search to search shop sites, such as AOL shop sites, and other partner sites, such as those included in Shop@AOL's Primary Supported Sites. If the item is found, then the user makes a purchase using a wallet, such as the Quick checkout wallet or ShopDirect. The purchase is thereby easy and simple for the user. And, if during the transaction process, it is determined that the user does not have a wallet, then the user is offered such wallet. Additionally, the user can be sent a thank you note.

In a second example of implementing the preferred embodiment of the invention, a user owns a wish list and an item on the wish list costs an amount of dollars that is considered too high for one person to buy. However, the item would be affordable to a number of buddies contributing funds towards the purchase of this item. This embodiment of the invention provides the option of a number of buddies making a contribution towards this item. An account for accumulating contributed amounts is opened for the member's wish list. When the money is collected, the user can then purchase the item. When the item is purchased, those buddies who contributed towards the purchase of the item are optionally sent a thank you note. A member can also contribute himself towards the purchase of the item.

The invention provides numerous advantages. From the business perspective, it increases the number of accounts, such as wallets used, member acquisition and retention, and service enhancements. For a user it fosters saving and budgeting. For example, children can learn to save funds towards purchasing a desired item. Each person who has a wish list will have an account on a larger domain, such as a portal like AOL, hence it is easily trackable. Each wish list is easily visible as it is attached to the buddy list. The probability of converting the wish list to a transaction is high. Because instant messaging is available on portables, such as cell phones and PDA's, a person can check with the buddy list while shopping and pick an item from the buddy's wish list.

Figure 2:
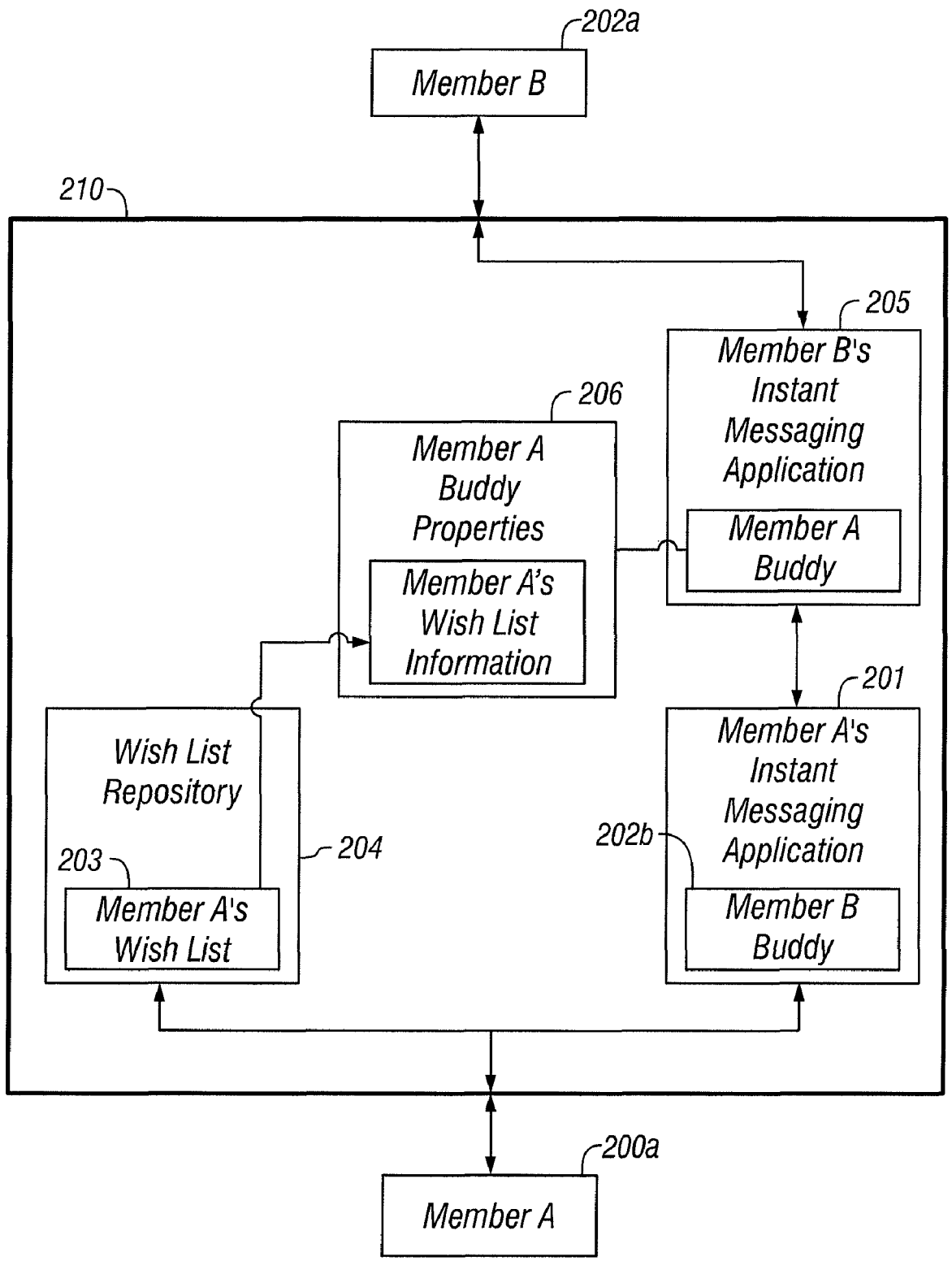
FIG. 2 is a schematic diagram of components according to the invention.

A preferred embodiment of the invention is described with reference to FIG. 2, a schematic diagram of components. A user, Member A 200a, connected to a network 210, uses an instant messaging application 201 and has created a buddy, Member B 202b, within such instant messaging application 201. In addition, Member A 200a has created a wish list 203, which resides in a wish list storage facility or repository 204. Another user, Member B 202a, which also has a listing in Member A's buddy list, Member B 202b, also connected to the network 210 uses an instant messaging application 205 that communicates with Member A's instant messaging application 201. Associated with the buddy list member is a list of buddy properties or information. As such, Member B 202a has access to Member A's properties 206. Such properties can be displayed in a separate GUI window, for example, from Member B 202a clicking a link or clicking a right mouse button, and the like. When Member A's properties 206 are accessed, because Member A has a wish list 203, the information on such wish list 203 is pulled into the display of Member A's properties 206. Therefore, Member B 202a has access to Member A's wish list 203.

From there, Member B can act on the information in Member A's wish list in any manner he or she pleases, such as go to a store and purchase an item from the wish list, for example.

Figure 3:
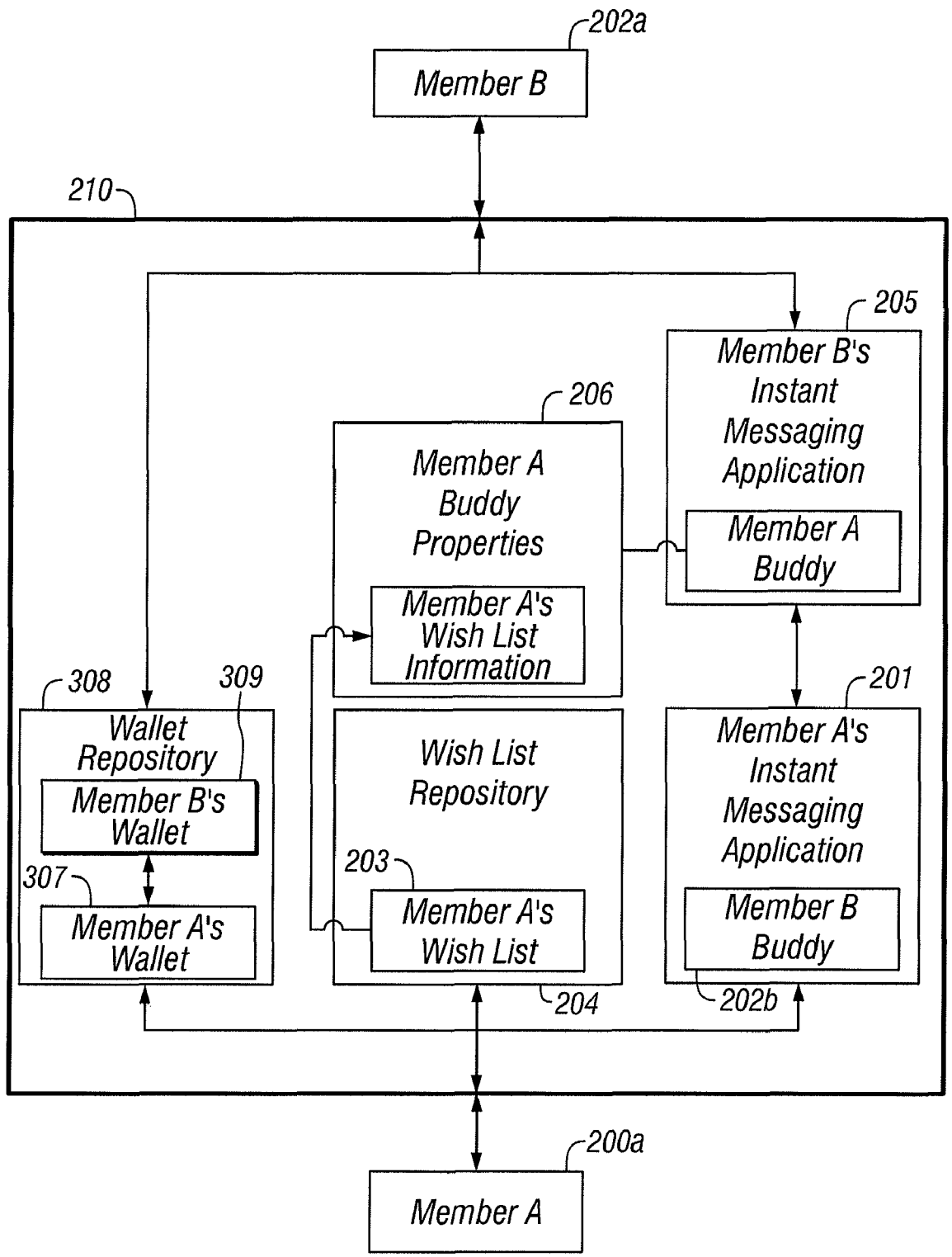
FIG. 3 is a schematic diagram of components based on FIG. 2 according to the invention.

An equally preferred embodiment of the invention is described with reference to FIG. 3, a schematic diagram of components based on FIG. 2. In this embodiment of the invention, Member A 200a has an account 307, such as a wallet, stored in an account storage facility or repository 308. Through Member A's client configuration 200a, Member A can use funds stored in the account 307 to eventually purchase an item listed in the wish list 203.

In a further equally preferred embodiment of the invention, Member B also has an account 309 stored in the account repository 308. Member B 202a can transfer funds from his or her account 309 to Member A's account 307 to apply towards the purchase of an item on Member A's wish list 203.

FIG. 4 is an example of a properties display for a member of an instant messaging application according to the invention. The properties display includes member information, such as, but not limited to how long the member has been online in the current session, important dates such as the member's birth date and wedding anniversary date, and wish list items, such as, for example a DVD player.

It should be appreciated that an equally preferred embodiment of the invention incorporates a plurality of buddies in Member A's buddy list.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for sharing wish list information between users, the method comprising the steps of:
   maintaining, with a computer, a plurality of wish lists in a wish list repository on a particular portal on a network for a plurality of users on said particular portal, each of said wish lists being associated with a specific user and comprising at least items offered for sale by a third party not associated with a wish list, said items being identified by an associated user as being desired by said associated user;
   making, with the computer, each wish list associated with each user of said plurality of users automatically viewable to said associated user and to other users of said plurality of users;
   wherein said plurality of users are buddies with said associated user in an instant messaging application and have access to said associated user's wish list through their buddy properties;
   attaching, with the computer, said items on said wish list to a wallet account of said associated user in a wallet repository on aid particular portal on said network;
   receiving, with the computer, gifts including receiving requests from multiple users of said other users than can automatically view said wish list to contribute funds to said wallet account towards a purchase of an item on an associated user's wish list as a gift for said associated user, wherein each of said multiple users has a wallet account in said wallet repository;
   said multiple users contributing, with the computer, funds from said each wallet account to said wallet account of said associated user towards said purchase;
   storing, with the computer, an indication of an amount of contributed funds in said associated user's wallet account;
   allowing for automatically and electronically executing, with the computer, a purchase of said item as a gift for said associated user upon said contributed funds equaling a purchase price of said item;
   updating, with the computer, said associated user's wish list to delete said purchased item from said wish list and said buddy properties.

2. The computer implemented method of claim 1, further comprising the step of:
   generating, with the computer, a thank-you note for each user that contributed funds towards said purchase; and
   electronically transmitting, with the computer, said thank-you note to each user.

3. The computer implemented method of claim 1, further comprising the step of:
   receiving from a user, with the computer, dates of events associated with said user.

4. The computer implemented method of claim 3, further comprising the step of:
   displaying, with the computer, said dates of events associated with said user along with said user's wish list.

5. The computer implemented method of claim 3, wherein said dates of events comprise at least one of said user's birthday and said user's marriage anniversary date.

6. An apparatus comprising:
   a network of computers;
   a wish list repository stored on said network for maintaining a plurality of wish lists in a wish list repository on a particular portal for a plurality of users on said particular portal and comprising at least items offered for sale by a third party not associated with a wish list, said items being identified by an associated user as being desired by said associated user;

wherein said wish list repository is configured for making each wish list associated with each user viewable to that associated user and to other users of said plurality of users;

wherein said plurality of users are buddies with said associated user in an instant messaging application and have access to said associated user's wish list through their buddy properties;

a wallet repository configured for attaching each wish list to an associated wallet account;

wherein requests are received from multiple users of said other users than can automatically view said wish list to contribute funds to said account towards a purchase of an item on said user's wish list as a gift for said user, wherein each of said multiple users has a wallet account in said wallet repository;

wherein said multiple users contribute funds from said each wallet account to said wallet account of said associated user towards said purchase of said item;

wherein an indication of an amount of contributed funds in said associated user's wallet account is stored;

wherein said wallet account is configured for automatically and electronically executing a purchase of said item as a gift for said user upon said contributed funds equaling a purchase price of said item; and wherein said user's wish list is updated to delete said purchased item from said wish list and said buddy properties.

7. The apparatus of claim 6, wherein:

a thank-you note for each user that contributed funds towards said purchase of said item is generated; and said thank-you note to each user is electronically transmitted.

8. The apparatus of claim 6, wherein dates of events associated with said user are received from said user.

9. The apparatus of claim 6, wherein said dates of events associated with said user along with said user's wish list are displayed.

10. The apparatus of claim 6, wherein said dates of events comprise at least one of said user's birthday and said user's marriage anniversary date.

11. A computer-implemented method for sharing wish list information between users, the method comprising the steps of:

maintaining, with a computer, a plurality of wish lists in a wish list repository on a particular portal on a particular network for a plurality of users on said particular portal, each of said wish lists being associated with a specific user and comprising at least items offered for sale by a third party not associated with a wish list, said items being identified by an associated user as being desired by said associated user;

making, with the computer, each wish list associated with each user of said plurality of users automatically viewable to said associated user and to other users of said plurality of users and only to said associated user and to each of said other users of said particular portal by said plurality of users and said associated user using a particular application on said portal on said network of which said plurality of users and said associated user are members and by which said members can view other members properties;

attaching, with the computer, said items on said associated user's wish list to a wallet account of said associated user in a wallet repository on said particular portal on said network;

receiving, with the computer, requests from multiple users of said other users that can automatically view said wish list to transfer funds to said associated user's wallet account towards a purchase of an item on said associated user's wish list as a gift for said associated user, wherein each of said multiple users has a wallet account in said wallet repository;

said multiple users directly transferring, with the computer, funds from said each wallet account to said wallet account of said associated user towards said purchase;

storing, with the computer, an indication of an amount of transferred funds in said associated user's wallet account;

allowing for automatically and electronically executing, with the computer, a purchase of said item as a gift for said associated user upon said transferred funds equalling a purchase price of said item; and updating, with the computer, said associated user's wish list to delete said purchased item from said wish list.

\* \* \* \* \*

UNITED STATES PATENT AND TRADEMARK OFFICE
CERTIFICATE OF CORRECTION

PATENT NO.          : 7,925,542 B2
APPLICATION NO.     : 12/258237
DATED               : April 12, 2011
INVENTOR(S)         : Ketan Shah It is certified that error appears in the above-identified patent and that said Letters Patent is hereby corrected as shown below:

In the Claims

Claim 1, Column 6, line 25, please replace "repository on aid" with --repository on said--.

Claim 1, Column 6, line 27, please replace "other users than" with --other users that--.

Claim 6, Column 7, line 16, please replace "other users than" with --other users that--.

Signed and Sealed this
Tenth Day of June, 2014

Michelle K. Lee
*Deputy Director of the United States Patent and Trademark Office*